United States Patent
Blach

(10) Patent No.: US 9,061,452 B2
(45) Date of Patent: Jun. 23, 2015

(54) EXTRUDER

(75) Inventor: Josef Blach, Ehrwald (AT)

(73) Assignee: Josef Blach, Ehrwald (AT)

( * ) Notice: Subject to any disclaimer, the term of this patent is extended or adjusted under 35 U.S.C. 154(b) by 95 days.

(21) Appl. No.: 13/636,194

(22) PCT Filed: Mar. 24, 2011

(86) PCT No.: PCT/EP2011/001477
§ 371 (c)(1),
(2), (4) Date: Jun. 13, 2013

(87) PCT Pub. No.: WO2011/116965
PCT Pub. Date: Sep. 29, 2011

(65) Prior Publication Data
US 2013/0259966 A1 Oct. 3, 2013

(30) Foreign Application Priority Data
Mar. 24, 2010 (AT) .................. A 468/2010

(51) Int. Cl.
*B29B 7/48* (2006.01)
*B29C 47/40* (2006.01)
(Continued)

(52) U.S. Cl.
CPC ................. *B29C 47/08* (2013.01); *B29B 7/482* (2013.01); *B29B 7/485* (2013.01); *B29B 7/489* (2013.01);
(Continued)

(58) Field of Classification Search
CPC .......... B29B 7/48; B29B 7/482; B29B 7/485; B29B 7/489; B29C 47/40; B29C 47/402; B29C 47/42; B29C 47/64; B29C 47/6056
USPC .................. 425/204, 208; 366/82, 84, 85, 90
See application file for complete search history.

(56) References Cited

U.S. PATENT DOCUMENTS 4,015,833 A * 4/1977 Kim .................... 366/82
4,300,839 A 11/1981 Sakagami
(Continued)

FOREIGN PATENT DOCUMENTS

CA 2728438 A1 12/2009
DE 862668 C 1/1953
(Continued)

OTHER PUBLICATIONS

International Search Report dated Aug. 26, 2010 corresponding to International Patent Application No. PCT/EP2009/005162.
(Continued)

*Primary Examiner* — Yogendra Gupta
*Assistant Examiner* — Joseph Leyson
(74) *Attorney, Agent, or Firm* — Thompson Coburn LLP

(57) ABSTRACT

An extruder having a housing (1) comprises at least two conveyor shafts (2, 3) having conveyor cross sections mutually wiping each other that can be driven in the same direction and are disposed in at least two housing bores (11, 12) having a cylindrical or conical design, the axes (15, 16) thereof being disposed parallel to or at an angle to each other, the distance (A) between the axes of the two housing bores (11, 12) being greater than D/1.4142, where D is the diameter of the cylindrical bore or the greatest diameter of the conical bore, and a clearance (a') being provided between the housing bores (11, 12) and the outer diameter (DE) of the conveyor shafts (2, 3). Each conveyor shaft (2, 3) comprises a plurality of conveyor segments (17a through d, 18a through d), wherein the offset angle of at least two adjacent conveyor segments (17a, 17b, 18a, 18b) on each conveyor shaft (2, 3) relative to each other is 180°. The center point (PM) of the cross sectional profile of each conveyor segment (17a, 17b, 18a, 18b, etc.) is disposed eccentrically relative to the center point (BM) of the housing bore (11, 12) and the center of rotation (DM) of the conveyor shafts (11, 12).

11 Claims, 6 Drawing Sheets

(51) Int. Cl.
*B29C 47/08* (2006.01)
*B29C 47/38* (2006.01)
*B29C 47/42* (2006.01)
*B29C 47/60* (2006.01)
*B29C 47/00* (2006.01)

(52) U.S. Cl.
CPC ............ *B29C 47/0009* (2013.01); *B29C 47/38* (2013.01); *B29C 47/402* (2013.01); *B29C 47/42* (2013.01); *B29C 47/6012* (2013.01); *B29C 47/605* (2013.01); *B29C 47/0881* (2013.01); *B29C 47/6056* (2013.01)

(56) References Cited

U.S. PATENT DOCUMENTS

| | | | |
|---|---|---|---|
| 4,824,256 | A | 4/1989 | Haring et al. |
| 5,000,900 | A | 3/1991 | Baumgartner |
| 5,597,235 | A | 1/1997 | Barnes et al. |
| 7,270,471 | B2 | 9/2007 | Blach |
| 8,172,450 | B2 | 5/2012 | Blach |
| 8,434,928 | B2 | 5/2013 | Blach |
| 2005/0041521 | A1* | 2/2005 | Herter ............... 366/82 |
| 2005/0084559 | A1 | 4/2005 | Blach |
| 2011/0110183 | A1* | 5/2011 | Bierdel et al. ............ 366/301 |
| 2011/0141843 | A1 | 6/2011 | Bierdel et al. |
| 2012/0188840 | A1 | 7/2012 | Blach |

FOREIGN PATENT DOCUMENTS

| | | | |
|---|---|---|---|
| DE | 3123699 | A1 | 4/1982 |
| DE | 10207145 | A1 | 9/2003 |
| DE | 10233213 | A1 | 2/2004 |
| DE | 102004010553 | A1 | 9/2005 |
| DE | 102008016862 | A1 | 10/2009 |
| DE | 102008029305 | A1 | 12/2009 |
| EP | 0002131 | A1 | 5/1979 |
| EP | 0788867 | A1 | 8/1997 |
| EP | 0788868 | A1 | 8/1997 |
| WO | WO 2009152910 | A1 * | 12/2009 |

OTHER PUBLICATIONS

International Search Report and Written Opinion for PCT/EP2011/001477 dated Aug. 12, 2011.

* cited by examiner

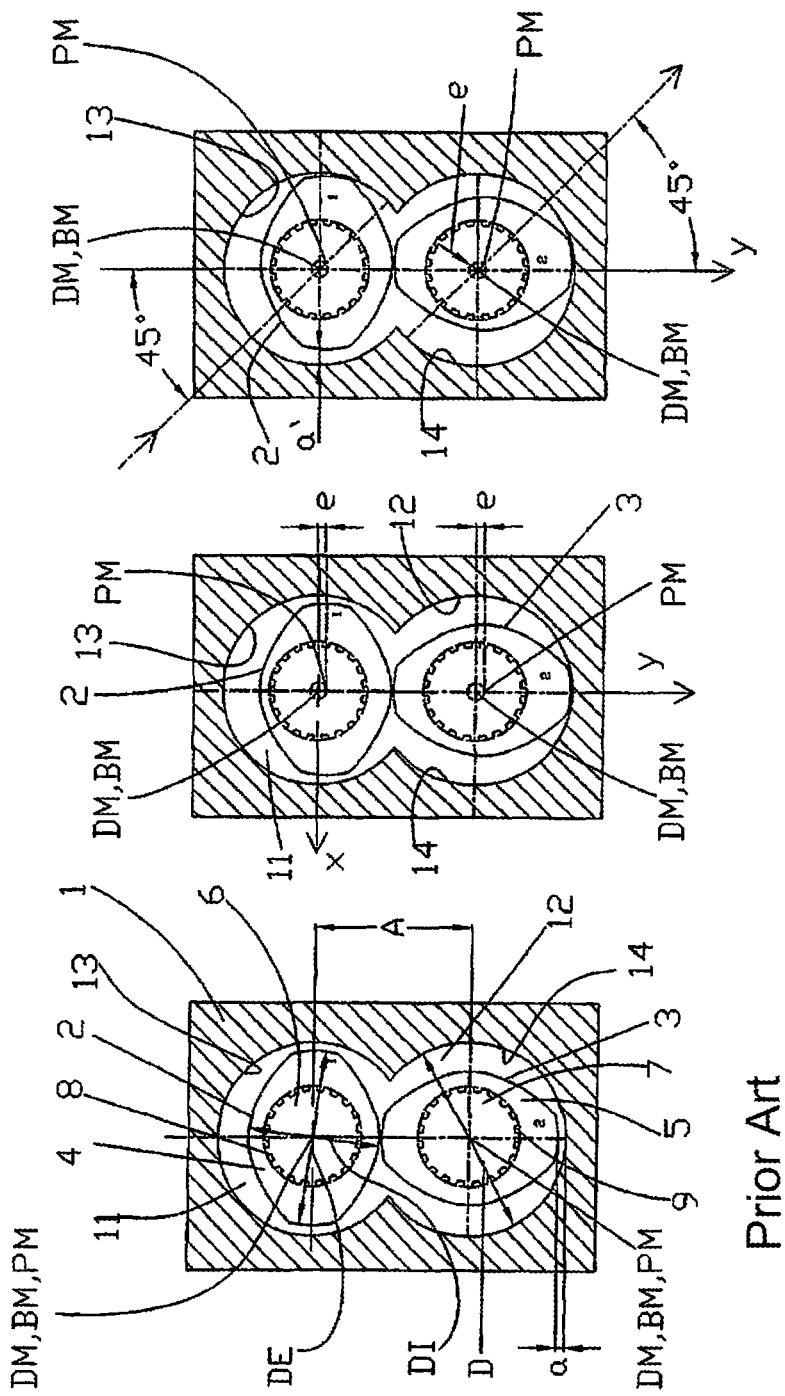

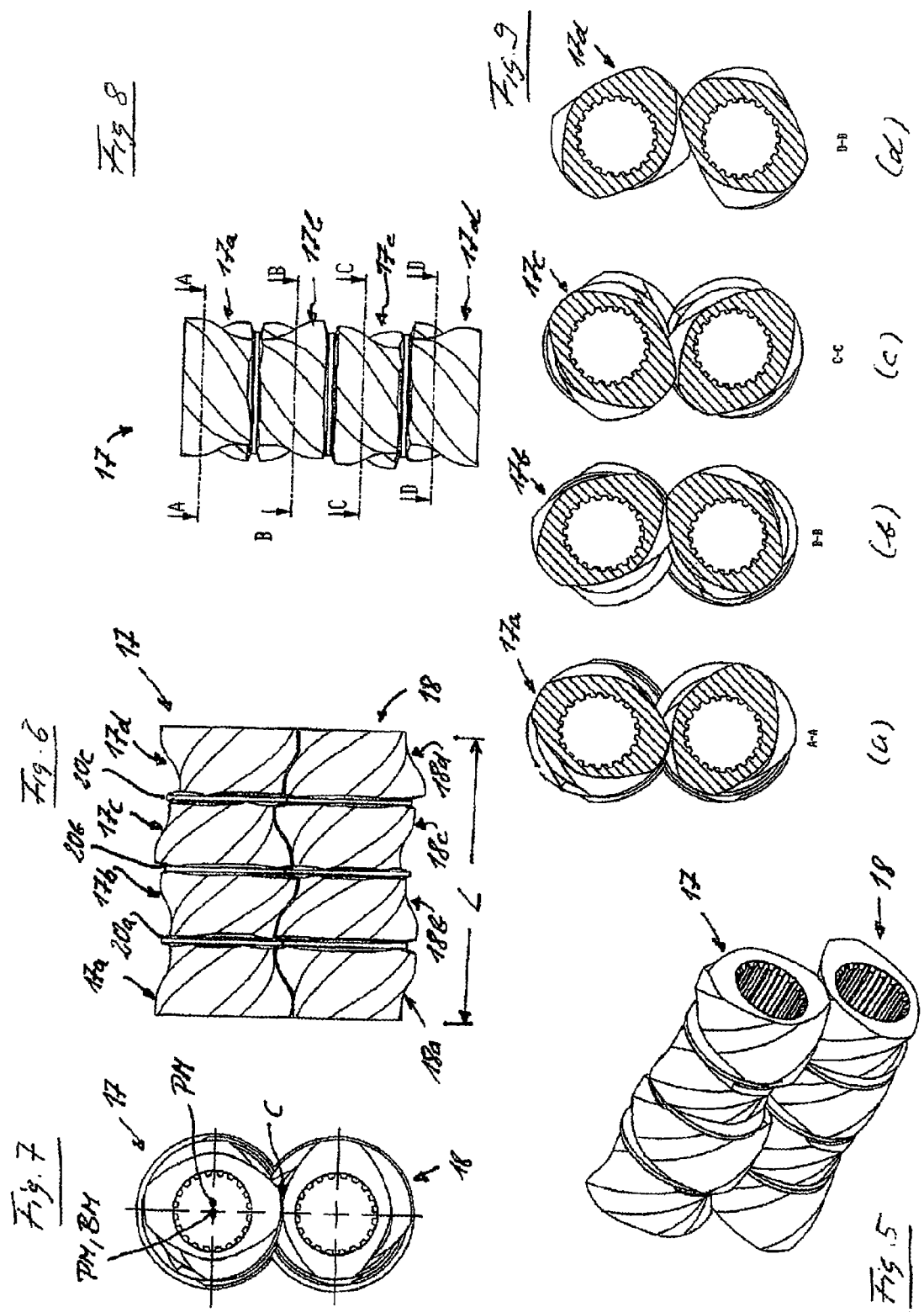

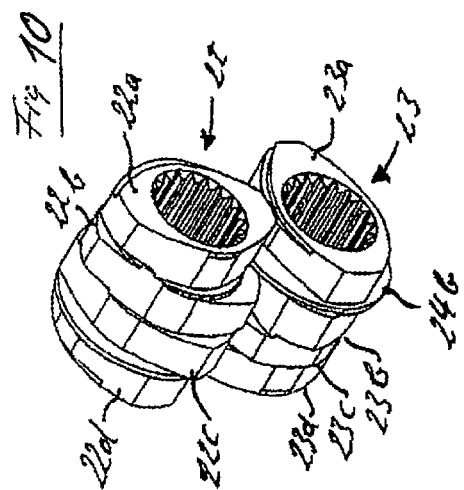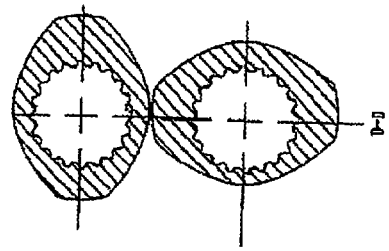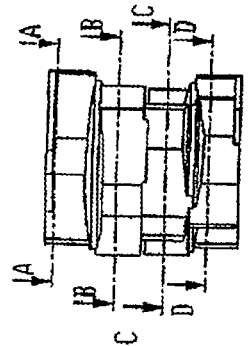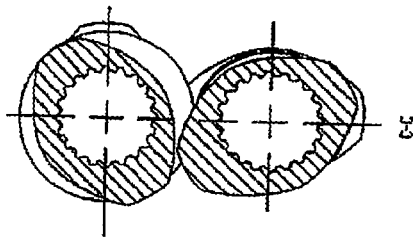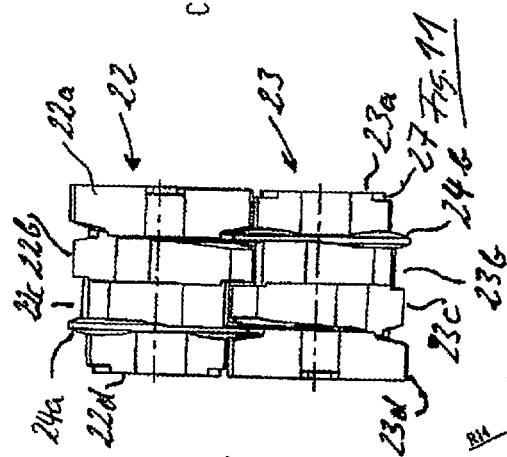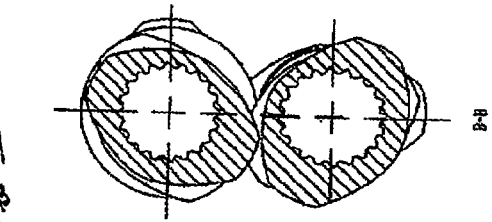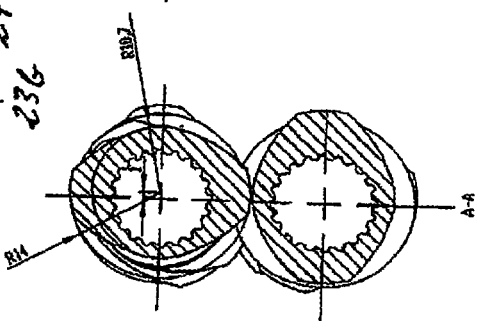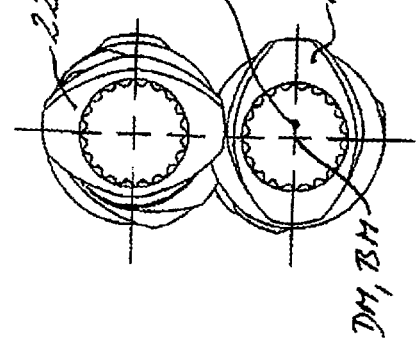

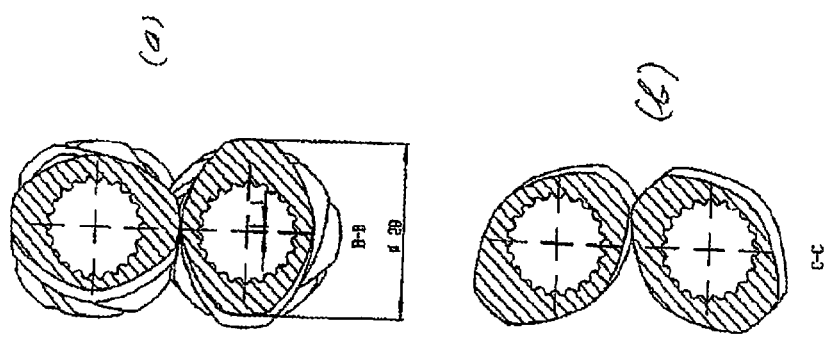
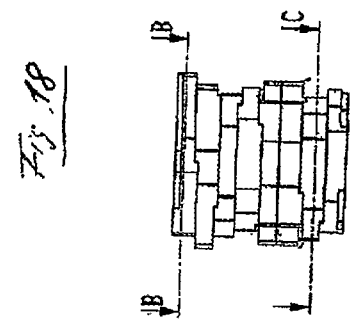
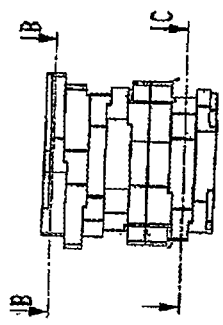
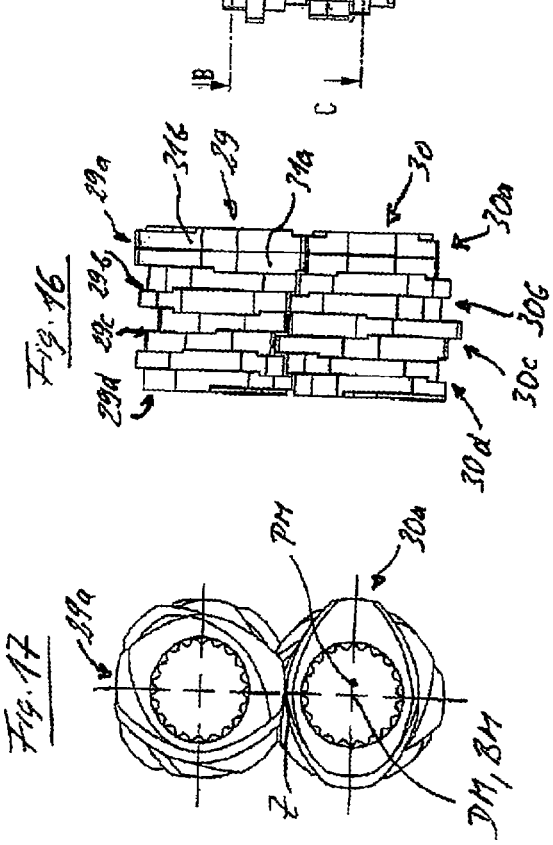
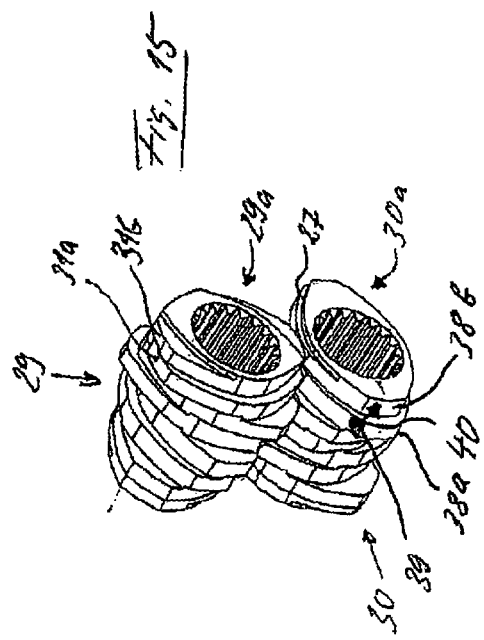

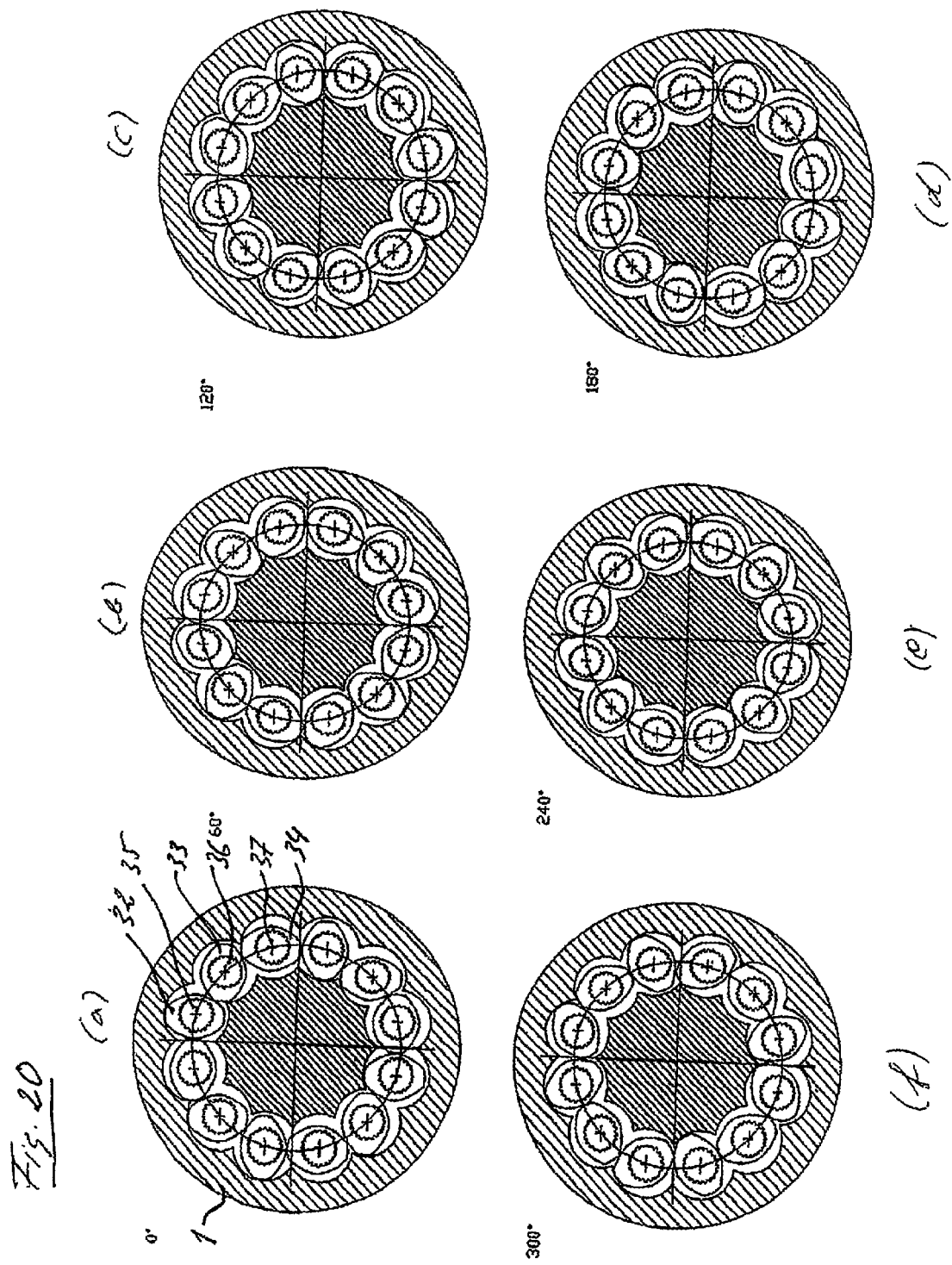

EXTRUDER

CROSS-REFERENCE TO RELATED APPLICATIONS

This application is a national stage application of International Patent Application No. PCT/EP2011/001477, published as WO2011/116965, which was filed on Mar. 24, 2011, which claims priority to Austrian Patent Application No. A 468/2010, filed Mar. 24, 2010, the disclosures of which are incorporated by reference herein.

BACKGROUND AND SUMMARY

The disclosure relates to an extruder having a housing comprising at least two conveyor shafts with mutually wiping conveyor cross sections that can be driven in the same direction and are disposed in at least two housing bores having a cylindrical or conical design, the axes thereof being disposed parallel to or at an angle to each other. The distance between the axes of the two housing bores is greater than D/1.4142, where D is the diameter of the cylindrical bore or the greatest diameter of the conical bore. A clearance is provided between the housing bores and the outer diameter of the conveyor shafts.

Auger shafts rotating in the same direction, which can be optimally equipped with dual conveyor elements in an extruder, are used for continuously feeding, mixing, dispersing, and extruding plastics in particular, and in continuous mechanical process engineering. The ability to process as many products as possible with one auger configuration, with no loss of quality, intermediate cleaning, or machine stoppage is of great economic significance. There is a very close relationship between the dwell time behavior of the product in the system and the material exchange and self-cleaning in the processing area. A wide process window means diverse utilization and product variety.

Double augers having a modular conveyor element system have long been known. For the geometric design of tightly meshing conveyor systems, according to the state of the art, the clearance between the core diameter of the conveyor element and the flight of the meshing conveyor element is typically 1.0% of the housing bore, and between the flight and the bore is typically 2 to 10%. For unfavorable circumstances, mainly for larger diameters and/or products having very different particle sizes, according to DE 10 2008 029 305 AI, the flight angle is reduced by means of a profile correction in order to reduce the specific energy input and thus partial product damage and the risk of machine damage.

An extruder as described above is previously known from DE 10 2004 010 553 AI and is particularly suitable for sensitive materials and/or high shaft speeds due to the increased clearance between the housing bore and the flight of the conveyor shafts. Because the housing bore cannot be scraped off, however, the field of application of the known extruder is limited for screw and for kneading blocks.

The object of the invention is to improve product quality and reduce torque load peaks on the support shafts, thereby decisively improving the economic efficiency of the extruder. The object is achieved according to the invention by providing the extruder with each conveyor shaft having a plurality of conveyor segments and the offset angle of at least two adiacent conveyor segments on each conveyor shaft relative to each other is 180°, wherein the center point of the cross sectional profile of each conveyor segment is offset eccentrically relative to the center point of the housing bore and the center of rotation of the conveyor shaft, wherein the center point of the cross sectional profile of each conveyor shaft is formed by the intersection of the two mirror planes of the cross sectional profile of the conveyor shaft.

The extruder according to the invention comprises at least two double-fluted conveyor shafts comprising a precisely mutually wiping conveyor cross section, that is, the clearance substantially only compensates for production tolerances.

For the augers of a double auger extruder comprising a geometry precisely wiping the bore wall, according to the book "The co-rotating double auger extruder", by Klemens Kohlgrüber, Carl Hanser Verlag, Munich 2007, Page 102, the formula $$A/D \geq \cos\left(\frac{90}{Z}\right),$$

applies, where
A is the distance between the axes of the two bores, D is the bore diameter, and Z is number of flutes, that is, for double-fluted augers having a geometry precisely wiping the cross sectional profile of the auger shafts and the bore wall, A/D>cos 45°>0.707. That is, the distance A between the axes of the two bores is greater than D/1.4142.

Each conveyor shaft comprises at least two adjacent conveyor segments. The angle of rotation from one conveyor segment of the at least two conveyor segments to the adjacent conveyor segment is 180°, that is, the at least two adjacent conveyor segments on each conveyor shaft are rotated 180° relative to each other.

The conveyor cross sections of the conveyor shaft segments wiping each other are rotated 360°/n to each other, where n is number of flutes.

The extruder according to the invention can, as is typical, comprise cylindrical bores having parallel axes. The invention, however, further relates to extruders having conical bores comprising axes approaching each other at an angle.

The center of the cross sectional profile of each conveyor segment is disposed eccentrically relative to the center of the housing bore and the center of rotation of the conveyor shaft. The center of the cross sectional profile of each conveyor segment is formed by the intersection of the two mirror planes of the cross sectional profile of the conveyor segment.

The eccentricity by which the center of the cross sectional profile of the conveyor segments is offset relative to the center of the housing bore and the center of rotation of the conveyor shafts is no greater than (D−A)/4.

The center of the cross sectional profile of the conveyor segments is preferably offset by 45° relative to the two mirror planes of the cross sectional profile, because at this angle all bores are wiped in every angular position of the shafts.

For a double-fluted conveyor shaft, one flute of each of the conveyor segments thereby comprises a clearance from the housing bore corresponding to the eccentricity, while the second flute of the conveyor shaft continuously wipes the housing bore. Both the housing bore and the conveyor profile of the auger shafts are thereby wiped along the entire circumference.

The arbitrary selection of the eccentricity between the housing bore diameter and the outer diameter of the conveyor shaft, and thus the layer thickness, makes the flight depth correspondingly less.

The reduced conveyor effect due to the gap between the conveyor shaft and the housing bore causes the fill level and material exchange to increase, while the partial material loading is reduced.

According to the invention, the flight of the one conveyor segment of each conveyor shaft wipes against the bore wall, while a gap is formed between the adjacent flight of the adjacent conveyor segment of the corresponding conveyor shaft. The flow direction of the product is thereby disturbed. That is, the material that is blocked against the flight wiping against the bore wall can flow out into the area of the gap formed by the adjacent flight of the adjacent conveyor segment of said conveyor shaft.

The two adjacent conveyor segments are preferably each formed by two partial discs of a cam disc, wherein both partial discs of each cam disc are rotated by 180° relative to each other.

By means of the extruder according to the invention, balanced dynamic conditions of the conveyor shaft are achieved, which are of great importance, as uniform loading serves as the basis for the technical design of the support shafts and the gearbox, and is a prerequisite for economical long-term operations. Measurements of the torque at the support shafts, using a resolution of milliseconds, have indicated that there are no further technical or technological requirements of typical kneading blocks that cannot be met. While the technical requirement for an overload of 10% for a maximum permissible long-term load on the shafts must be considered very critically, kneading blocks can often cause a load to vary by 30% for each revolution. In order to prevent fatigue failure of the shafts in all cases, the full machine rated power cannot be used. Even for a profile wrap of 180° of the individual discs in kneading blocks, a better product can be achieved under lower peak loads, and the 180° wrap is used for continuously running an auger thread, providing the least fluctuations of the peak load with a better product mix.

The length of each conveyor segment or each partial disc in the axial direction is preferably no greater than the bore diameter, particularly a maximum of half of the bore diameter.

Each conveyor shaft and the at least one conveyor element according to the invention supported thereby can form a single component. By implementing the shaft and conveyor element as one piece, a substantially greater torque can be transmitted. For example, the shaft, including the drive shaft, and the conveyor element in the area of the filling zone, including the melt zone, can be made as a single component.

According to the invention, a repeated wound profile is used, providing additional resistance to the axial flow rate of the product. That is, the flight depth over the entire exposed cross section is changed, whereby the entire product and the extruder are uniformly more greatly loaded.

The flights of the conveyor shaft can thereby run perpendicular to the axes of the holes, or can be implemented diagonally as augers.

The conveyor shafts preferably comprise barrier rings concentric to the bore axis between two conveyor segments, the diameters thereof corresponding to no greater than the distance between the axes. The material flow in the axial direction can thereby be slowed, and the dispergent effect can be increased. The barrier rings can thereby be disposed at varying distances between the conveyor segments.

The conveyor segments can also be formed by segments of a one-piece conveyor element, obtained by milling a metal part, for example.

By means of the extruder according to the invention, tensile and compressive forces are exerted on the solid agglomerates present therein by means of the viscosity of the continuous phase, leading to the fatigue failure of the same.

Therefore, effective homogenization and dispersion of the solid is achieved according to the invention, even for solid particles having a particle size of less than 100μ, particularly less that 10μ. By means of the extruder according to the invention, the product is thus continuously exposed to a different flow direction and speed, and therefore different strain conditions.

According to the invention, the large distance from the one flight of the conveyor segments to the housing bore causes great material exchange, while only slight material exchange takes place where the flight wipes against the wall of the housing bore. However, the greatest dispergent effect can be achieved there by highly loading the product, as well as by the precisely wiping conveyor cross sections of the two conveyor shafts. Due to the mutually wiping conveyor segment rotated by an angle of 180° at the one or the other conveyor shaft for a double-flute conveyor shaft, the product is subjected to external loading only in small areas, whereby the temperature of the product must be kept low overall, so that the product is not damaged, even in the extremely highly loaded areas, and is therefore handled gently overall. The extruder according to the invention is thereby particularly suited for processing sensitive products, such as for producing polyethylene terephthalate (PET).

According to a preferred embodiment, the extruder comprises at least six conveyor shafts disposed along a circle at equal central angle spacing, each wiping against the two adjacent conveyor shafts. The vacuum is thereby doubled with particularly high density at the flows. Because this is done without peak loads and thereby without an undesirable drop in viscosity over the entire length of the conveyor shafts, an effective, rapid mixing is achieved, as well as even substantially higher product quality and greater throughput with uniform homogenization.

If the conveyor cross sections of the conveyor shafts for the said embodiment are formed by conveyor segments wherein the conveyor segments wiping each other for a double-fluted conveyor shaft are rotated by 180°, the profile wrap, that is the stepwise change in flight depth in the axial direction between two adjacent shafts, is doubled and thereby substantially increased.

DESCRIPTION OF THE DRAWINGS

The invention is explained in greater detail below, using the attached drawing. Shown are:

FIG. 1, a cross section through two conveyor elements of a known double-shaft extruder meshing with each other, according to DE 10 2004 010 553 Al;

FIGS. 2 and 3, one cross section each through two conveyor elements of a known double-shaft extruder meshing with each other and disposed eccentrically;

in FIGS. 4(a) and 5(a).

FIGS. 5, 6, and 7, a perspective view, a side view, and a cross section of two double-flight conveyor elements meshing with each other and having auger segments and barrier rings according to the invention;

FIG. 8, a side view of one of the two conveyor elements according to FIGS. 5 through 7;

FIGS. 9(a) through 9(d), one section each through the two conveyor elements meshing with each other according to FIGS. 5 through 7 along the line A-A, B-B, C-C, and D-D in FIG. 8.

FIGS. 10, 11, and 12, a perspective view, a side view, and a cross section of two double-flight kneading blocks meshing with each other and having barrier rings;

FIG. 13, a side view of one of the two conveyor elements according to FIGS. 10 through 12;

FIGS. 14(a) through (d), one section each through the two conveyor elements meshing with each other according to FIGS. 10 through 12 along the line A-A, B-B, C-C, and D-D in FIG. 13;

FIGS. 15 through 17, a perspective view, a side view, and a cross section of two double-flight kneading blocks meshing with each other according to a further embodiment;

FIG. 18, a side view of one of the two kneading blocks according to FIGS. 15 through 17;

FIGS. 19(a) through (d), one section each through the two kneading blocks according to FIGS. 15 through 17 along the line B-B and C-C in FIG. 18; and FIG. 20(a) through (f), one cross section each through a multi-shaft extruder having conveyor shafts disposed along a circle having equal central angle spacing, in the initial position 0° according to FIG. 20(a), and rotated by 60°, 120°, 180°, 240°, and 300°.

DETAILED DESCRIPTION

Figure 4:
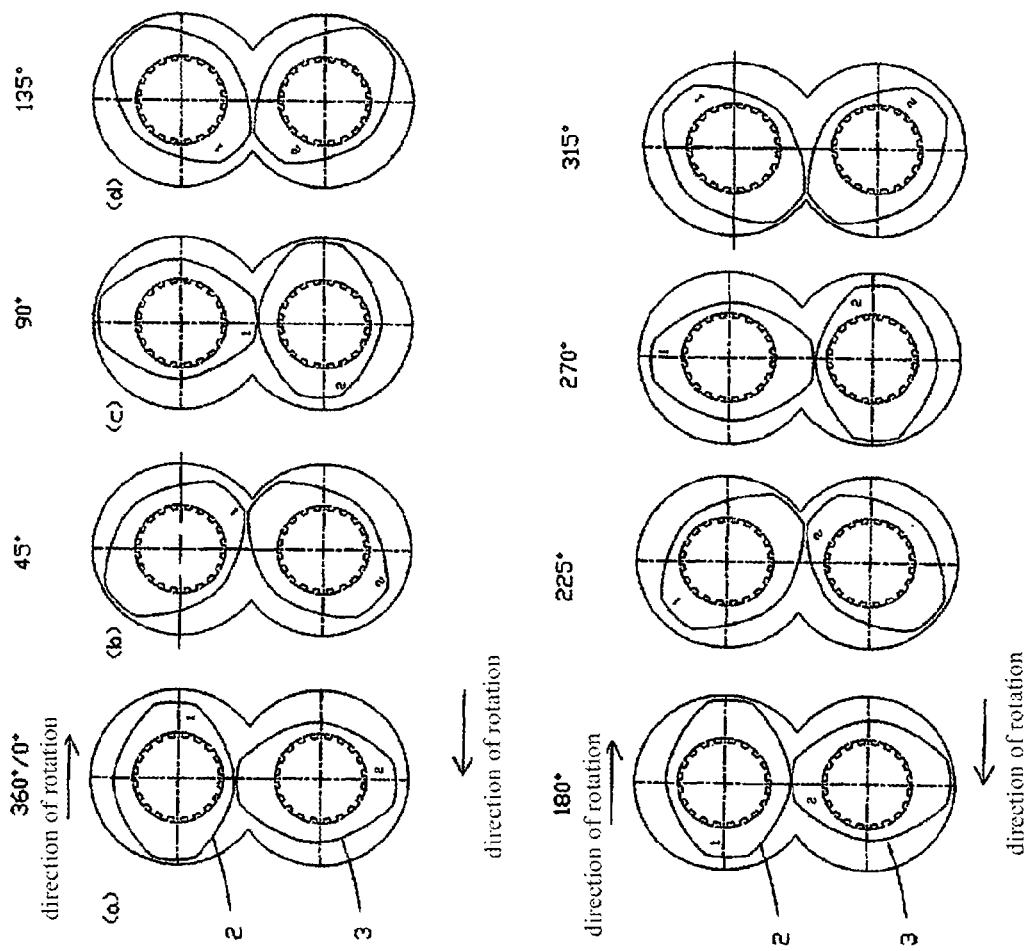
FIG. 4, a cross section of the two conveyor elements according to FIG. 3 meshing with each other, in the rotary positions of 0°, 45°, 90°, etc.

According to FIG. 1, a double-shaft extruder comprises two double-flight conveyor shafts 2, 3 in a housing 1, comprising conveyor elements 4, 5 each rotationally fixedly disposed on a support shaft 6, 7, such as by means of gear teeth 8, 9.

The conveyor shafts 2, 3 are disposed for driving in the same direction in two housing bores 11, 12, wherein the bore wall 13 and 14 of the bores 11, 12 is concentric to the axis of rotation of the conveyor shafts 2, 3 running through the center BM of the housing bore 11, 12 and the center of rotation DM of the conveyor shafts 2, 3.

The bores 11, 12 can thereby be cylindrical or conical in design, wherein for cylindrical bores 11, 12 the axes of rotation are parallel, and in the case of conical bores, said axes run at an angle to each other.

The housing bores 11, 12 comprise a diameter D. The axis spacing A, that is, the distance between the centers BM of the housing bores 11, 12, is greater than D/1.4142. The conveyor elements 4, 5 and thus the conveyor shafts 2, 3 comprise an outer diameter DE>D in cross section, having a mirror-symmetrical double-flight profile contour resulting from A and DE, and a flight depth GE=DE−A, and an internal diameter DI equal to DE−2GE. The conveyor shafts 2, 3 according to FIG. 1 are disposed centered. The center point PM of the cross sectional profile of the conveyor shafts 2, 3 is thereby coincident with DM and BM. A prescribed clearance a exists between the bore wall 13, 14 and the cross sectional profile of the conveyor shafts 2, 3. The conveyor profiles do thereby wipe against each other, but the surface of the housing bores 11, 12 is not scraped off.

In contrast to the known extruder according to FIG. 1, the center point PM of the cross sectional profile of the conveyor shafts 2, 3 is offset eccentrically by "e" relative to the center point BM of the housing bore 11, 12 and the center of rotation DM of the conveyor shafts 2, 3. The center point PM of the cross sectional profile of each conveyor shaft 2, 3 is thereby defined by the intersection of the two mirror planes x, y of the cross-sectional profile of each conveyor shaft 2, 3.

The eccentricity e by which the center point PM of the cross sectional profile of the conveyor shafts 2, 3 is offset relative to the center point BM of the housing bore 11, 12 and the center of rotation DM of the conveyor shaft 2, 3 is no greater than (D−A)/4.

According to FIG. 2, the cross sectional profiles of the two conveyor shafts 2, 3 are positioned having the center point PM eccentric by (D−DE)/2 in the direction of the mirror plane represented by the Y-coordinate while the location of the center of rotation DM of the conveyor shafts 2, 3 and the center point BM of the housing bore 11, 12 remain unchanged. A housing bore 12 is thereby continuously optimally cleaned.

The eccentricity e can, as indicated by the circle about DM and BM, be in any arbitrary direction.

In FIG. 3, the center point PM of the cross sectional profile of both conveyor shafts 2, 3 is offset eccentrically by "e" equidistantly by 45° relative to the two mirror planes x, y.

Both the two conveyor profiles are thus mutually wiped at the entire circumference, as well as the housing bores 11, 12, each in the same manner.

The free selection of the eccentricity e within the limits of D and DE, and thus of the layer thickness, makes the flight depth GE correspondingly different at the same time. While the one flute of the double-fluted conveyor shaft 2, 3 scrapes the bore wall 13 or 14 according to FIG. 3, as can be seen on the conveyor shaft 2, the other flight comprises the distance a* from the bore wall 13, 14. The gap thus formed does reduce the conveying effect, but the fill level and material exchange are thereby increased, while the partial material loading is reduced at the same time. The mixing effect transverse to the rotary axes is thus improved, and the dispergent effect is thereby increased.

Eight different rotary positions of the two conveyor shafts 4, 5 are shown in FIG. 8. The layer thickness between the flights of conveyor shafts 2, 3 and the bore wall 13, 14 is a maximum of D−DI. With different eccentricities e and/or angles of eccentricity E to the two mirror planes or main coordinates x, y, many different layer thicknesses can be set.

According to FIGS. 5, 6, 7 and FIGS. 9(a) to (d), the double-shaft extruder has single-piece conveyor elements 17, 18, each comprising a length L of 2.5 to 4D, for example, and made of conveyor segments 17a through 17d and 18a through 18d. The conveyor segments 17a through d and 18a through d of each conveyor element 17, 18 are disposed offset to each other in a stepwise progression by the same angle, such as 90°. Each conveyor segment 17a through d and 18a through d is implemented as a double-flight auger. The meshing conveyor segments thereby make contact at a point C in a substantially leak-tight manner, that is, with low clearance of less than 1 mm, for example, as is shown in FIGS. 7 and 9a. The conveyor segments 17a through d and 18a through d of each conveyor element 17, 18 comprise a cross sectional profile having a center point PM eccentrically offset relative to the center point BM of the housing bore 11, 12 and the center of rotation DM of the conveyor shaft 2, 3 each in the same manner, as described above in conjunction with FIGS. 2 through 4.

Barrier rings 20a through c, each concentric to the axis of rotation, are provided between two conveyor segments 17a through d and 18a through d of the conveyor elements 17 and 18.

While the embodiments according to FIGS. 5 through 9 relate to conveyor elements having auger segments having finite pitch, according to FIGS. 10 through 20, conveyor elements having auger segments of infinite pitch are provided in order to form mutually meshing kneading blocks 22, 23 as can be seen in FIGS. 10 through 14, in order to achieve a high specific energy input.

Each kneading block 22 and 23, as can be seen from FIGS. 10 through 14, is thereby made of cam discs 22a through d and 23a through d. For the embodiment according to FIGS. 10 through 14, barrier rings 24a, 24b each concentric to the axis of rotation of the conveyor shaft are provided between two cam discs 22a through c and 23a through d.

The cam discs 22a through d and 23a through d comprise a cross sectional profile perpendicular to the conveyor shafts, having a center point PM eccentrically offset relative to the center point BM of the conveyor shafts and the center of rotation of the housing bore in the same manner as described above in conjunction with FIGS. 2, 3 and 4. That is, each cam disc comprises two flights, wherein one of the two flights of each cam disc tightly wipes against the bore wall of the housing bore, while the other flight is disposed at a distance from the bore wall having a clearance due to the eccentricity of the cam disc.

Passages are thus also formed that bring about a conveying effect.

The kneading blocks 22 and 23 comprise cutouts 27 on the end faces thereof, in order to prevent adjacent kneading blocks from colliding due to tolerances.

According to FIGS. 15 through 19, each cam disc 29a through d and 30a through d of the kneading blocks 29, 30 is made of two partial discs rotated 180° relative to each other, as can be seen from the partial discs 31a and 31b of the cam disc 29a.

The mutually meshing cam blocks 22, 23 and 29 and 30 are eccentrically offset in the same manner as previously described specifically using FIGS. 2 through 4, and shown by PM relative to DM and BM. Due to the conveyor segments 17a through 17d and 18a through 18d of the embodiment according to FIGS. 5 through 9 offset at an angle, and the cam discs 22a through 22d and 23a through 23d of the embodiment according to FIGS. 10 through 14 offset at an angle, a repeated profile wrap of 180° occurs in the longitudinal direction of the conveyor shafts, providing additional resistance to the axial flow and being particularly effective in the area of the deflection in the gussets Z.

As can be seen particularly in FIG. 15, of the two adjacent partial discs 31a, 31b forming a conveyor segment, namely a cam disc of the kneading block 29, one cam disc 31a is rotated 180° relative to the adjacent partial disc 31b. The flight of the partial disc 31b thereby wipes against the bore wall, while a gap a is formed between the flight of the partial 31a and the bore wall (see also FIGS. 2 and 3.)

The same applies for the two partial discs 38a and 38b of the kneading block 30, which is rotated 180° relative to the partial discs 31a and 31b of the kneading block 29.

That is, the partial discs 38a and 38b of the kneading block 30 are also rotated 180° relative to each other. As shown in FIG. 15, material 29 collecting ahead of the flight of the partial disc 38a during operation of the extruder can thereby flow out according to the arrow 40 into the gap formed between the flight of the partial disc 38a and the bore wall.

According to FIG. 20(a) through (f), twelve conveyor elements 32, 33, 34 are attached to shafts 35, 36, 37 having parallel axes and disposed along a circle, wherein the conveyor elements 31 through 33 engage with each other at the entire circumference. The conveyor cross section of the conveyor elements 32, 33, 34 . . . are thereby disposed eccentrically in the same manner as previously specifically described using FIGS. 2 through 4. For said embodiment of the invention, the profile wrap between two adjacent shafts is nearly doubled relative to a double-shaft extruder.

The invention claimed is:

1. An extruder having a housing (1) comprising at least two conveyor shafts (2, 3) having mutually wiping conveyor cross sections that can be driven in the same direction and are disposed in at least two housing bores (11, 12) having cylindrical or conical design, the axes (15, 16) thereof being disposed parallel to or at an angle to each other, the distance (A) between the axes of the two housing bores (11, 12) being greater than D/1.4142, where D is the diameter of the cylindrical bore or the greatest diameter of the conical bore, and a clearance (a*) being provided between the housing bores (11, 12) and the outer diameter (DE) of the conveyor shafts (2, 3), characterized in that each conveyor shaft (2, 3) comprises a plurality of conveyor segments (17a through d, 18a through d) and the offset angle of at least two adjacent conveyor segments (17a, 17b, 18a, 18b) on each conveyor shaft (2, 3) relative to each other is 180°, wherein the center point (PM) of the cross sectional profile of each conveyor segment (17a, 17b, 18a, 18b, etc.) is offset eccentrically relative to the center point of the housing bore (11, 12) and the center of rotation (DM) of the conveyor shaft (2, 3), wherein the center point (PM) of the cross sectional profile of each conveyor shaft (2, 3) is formed by the intersection of the two mirror planes (x, y) of the cross sectional profile of the conveyor shaft (2, 3).

2. The extruder according to claim 1, characterized in that the eccentricity (e) by which the center point (PM) of the cross sectional profile of each conveyor segment (17a, 17b, 18a, 18b, etc.) is offset relative to the center point (BM) of the housing bore (11, 12) and the center of rotation (DM) of the conveyor shafts (2,3) is no greater than (D−A)/4.

3. The extruder according to claim 1, characterized in that the center point (PM) of the cross sectional profile of the conveyor segments (17a, 17b, 18a, 18b, etc.) is offset by 45° relative to each of the two mirror planes (x, y).

4. The extruder according to claim 1, characterized in that the length of each conveyor segment is no greater than the bore diameter (D).

5. An extruder having a housing (1) comprising at least two conveyor shafts (2, 3) having mutually wiping conveyor cross sections that can be driven in the same direction and are disposed in at least two housing bores (11, 12) having a cylindrical or conical design, the axes (15, 16) thereof being disposed parallel to or at an angle to each other, the distance (A) between the axes of the two housing bores (11, 12) being greater than D/1.4142, where D is the diameter of the cylindrical bore or the greatest diameter of the conical bore, and a clearance (a*) being provided between the housing bores (11, 12) and the outer diameter (DE) of the conveyor shafts (2, 3), characterized in that each conveyor shaft (2, 3) comprises a plurality of conveyor segments (1a through d, 18a through d) and the offset angle of at least two adjacent conveyor segments ((17a, 17b, 18a, 18b, ) on each conveyor shaft (2, 3) relative to each other is 180°, wherein the center point (PM) of the cross sectional profile of each conveyor segment ((17a, 17b, 18a, 18b, etc.) is offset eccentrically relative to the center point of the housing bore (11, 12) and the center of rotation (DM) of the conveyor shaft (2, 3), wherein the center point (PM) of the cross sectional profile of each conveyor shaft (2, 3) is formed by the intersection of the two mirror planes (x, y) of the cross sectional profile of the conveyor shaft (2, 3), wherein the conveyor segments are each formed by two partial discs (31a, 31b, 38a, 38b) of a cam disc (29, 30), wherein the two partial discs (31a, 31b, 38a, 38b) of each cam disc (29, 30) are rotated by 180° relative to each other.

6. The extruder according to claim 1, characterized in that the flights of the conveyor shafts run perpendicular to or as augers at an angle to the axes (15, 16) of the housing bores (11, 12).

7. The extruder according to claim 4 characterized in that the conveyor shafts (2, 3) comprise barrier rings (20a through c; 24a, 24b) between two conveyor segments (17a through d; 18a through d).

8. The extruder according to claim 7, characterized in that the barrier rings are disposed at different distances between the conveyor segments.

9. The extruder according to claim 7, characterized in that the diameter of the barrier rings (20*a* through *c*; 24*a*, 4*b*) is no greater than the distance (A) between the axes of the two housing bores (11, 12).

10. The extruder according to claim 1, characterized in that the conveyor segments (17*a* through *d*, 18*a*) are formed by segments of a single-piece conveyor element (4, 5).

11. The extruder according to claim 1, characterized in that at least six conveyor shafts are disposed along a circle at equal center angle spacings.

* * * * *